US009012377B2

(12) United States Patent
Khabashesku et al.

(10) Patent No.: US 9,012,377 B2
(45) Date of Patent: Apr. 21, 2015

(54) FUNCTIONALIZED SILICATE NANOPARTICLE COMPOSITION, REMOVING AND EXFOLIATING ASPHALTENES WITH SAME

(71) Applicants: Valery Khabashesku, Houston, TX (US); Oleg Mazyar, Houston, TX (US); Soma Chakraborty, Houston, TX (US); Gaurav Agrawal, Aurora, CO (US); Toby D. Hain, Windsor, CT (US)

(72) Inventors: Valery Khabashesku, Houston, TX (US); Oleg Mazyar, Houston, TX (US); Soma Chakraborty, Houston, TX (US); Gaurav Agrawal, Aurora, CO (US); Toby D. Hain, Windsor, CT (US)

(73) Assignee: Baker Hughes Incorporated, Houston, TX (US)

( * ) Notice: Subject to any disclaimer, the term of this patent is extended or adjusted under 35 U.S.C. 154(b) by 292 days.

(21) Appl. No.: 13/731,232

(22) Filed: Dec. 31, 2012

(65) Prior Publication Data
US 2014/0187449 A1 Jul. 3, 2014

(51) Int. Cl.
| C09K 8/52 | (2006.01) |
| C02F 5/08 | (2006.01) |
| E21B 37/06 | (2006.01) |
| C09K 8/524 | (2006.01) |

(52) U.S. Cl.
CPC ..................... *C09K 8/524* (2013.01)

(58) Field of Classification Search
USPC .................... 507/90, 234; 166/304
See application file for complete search history.

(56) References Cited

U.S. PATENT DOCUMENTS

| 6,048,904 A | 4/2000 | Wiehe et al. |
| 6,220,352 B1 | 4/2001 | Walton |
| 6,274,030 B1 | 8/2001 | Wallace et al. |
| 7,033,975 B2 | 4/2006 | Baran, Jr. et al. |
| 2008/0020949 A1 | 1/2008 | Trimble et al. |
| 2010/0096139 A1* | 4/2010 | Holcomb et al. ........ 166/308.1 |
| 2012/0255887 A1* | 10/2012 | Holms et al. ................ 208/390 |
| 2012/0329887 A1 | 12/2012 | Phukan et al. |

FOREIGN PATENT DOCUMENTS

EP 1509676 B1 1/2009

OTHER PUBLICATIONS

International Search Report and Written Opinion for related PCT Application No. PCT/US2013/077918, dated Apr. 22, 2014, pp. 1-19.
Tormod Skauge et al., Nano-Sized Particles for EOR, SPE International, Copyright 2010, Society of Petroleum Engineers, SPE 129933, This paper was prepared for presentation at the 2010 SPE Improved Oil Recovery Symposium held in Tulsa, Oklahoma, USA, Apr. 24-28, 2010, pp. 1-10.

* cited by examiner

*Primary Examiner* — Aiqun Li
(74) *Attorney, Agent, or Firm* — Cantor Colburn LLP

(57) ABSTRACT

Removing an asphaltene particle from a substrate includes contacting a silicate nanoparticle with a chemical group to form a functionalized silicate nanoparticle, the chemical group includes a first portion; and a second portion comprising an aromatic moiety, the first portion being bonded to the silicate nanoparticle; contacting the asphaltene particle with the functionalized silicate nanoparticle, the asphaltene particle being disposed on the substrate; interposing the functionalized silicate nanoparticle between the asphaltene particle and the substrate; and separating the asphaltene particle from the substrate with the functionalized silicate nanoparticle to remove the asphaltene particle. A composition includes a functionalized silicate nanoparticle comprising a reaction product of a silicate nanoparticle and an aromatic compound; and a fluid. The aromatic compound includes a chemical group that includes a first portion, the first portion being directly bonded to the silicate nanoparticle in the functionalized silicate nanoparticle; and a second portion including an aromatic moiety.

17 Claims, No Drawings

US 9,012,377 B2

FUNCTIONALIZED SILICATE NANOPARTICLE COMPOSITION, REMOVING AND EXFOLIATING ASPHALTENES WITH SAME

BACKGROUND

Asphaltenes are a major component in crude oil, and there is general agreement as to the deleterious effects of asphaltenes in the reduction of oil extraction and processing in the petrochemical industry. Asphaltenes can deposit in the pores of formations, blocking the flow of fluids. Additionally, asphaltenes can precipitate from a stream of oil and coat boreholes, production tubing, and transport lines. Moreover, in a processing facility, asphaltenes can foul processing equipment and poison catalysts.

Asphaltene molecules have been widely reported as having a fused polyaromatic ring system and containing heteroatoms such as sulfur, oxygen, nitrogen, and the like. The heteroatoms may be part of the aromatic ring system or part of other carbocyclic rings, linking groups, or functional groups. Two structural motifs for asphaltene molecules are the so-called continental and archipelago structures. In the continental structure, alkyl chains connect to and branch from a central polyaromatic ring system, which is believed to contain several fused aromatic rings, e.g., 5 or more aromatic rings. In the archipelago structure, multiple polyaromatic ring systems are connected by alkyl chains that may contain a heteroatom, and additional alkyl chains extend freely from the polyaromatic rings. The number of fused aromatic rings in the continental structure can be greater than the number of fused aromatic rings in the archipelago structure.

In addition to the aromatic regions of the asphaltenes, heteroatoms provide the asphaltenes with polar regions, and the terminal alkyl chains provide hydrophobic regions. Consequently, it is believed that asphaltene molecules aggregate into various micellular structures in oil, with the alkyl chains interacting with the aliphatic oil components. Resin from the oil can insert between aromatic planes of neighboring asphaltene molecules in asphaltene aggregates, aiding in maintaining their micellular structure. Asphaltenes can precipitate from oil in structures where asphaltene molecules form stacked layers having aligned aromatic regions and aligned aliphatic regions.

Materials and methods for treating and removal of asphaltenes from oil environments such as a reservoir would be well received in the art.

BRIEF DESCRIPTION

The above and other deficiencies of the prior art are overcome by, in an embodiment, a process for removing an asphaltene particle from a substrate, the process comprising: contacting a silicate nanoparticle with a chemical group to form a functionalized silicate nanoparticle, the chemical group comprising: a first portion; and a second portion comprising an aromatic moiety, the first portion being directly bonded to the silicate nanoparticle in the functionalized silicate nanoparticle; contacting the asphaltene particle with the functionalized silicate nanoparticle, the asphaltene particle being disposed on the substrate; interposing the functionalized silicate nanoparticle between the asphaltene particle and the substrate; and separating the asphaltene particle from the substrate with the functionalized silicate nanoparticle to remove the asphaltene particle from the substrate.

In another embodiment, a composition comprises: a functionalized silicate nanoparticle comprising a reaction product of a silicate nanoparticle; and an aromatic compound comprising aryl quaternary ammonium salt, aryl quaternary phosphonium salt, aryl alkoxy silane, aryl halide, heteroaryl quaternary ammonium salt, heteroaryl quaternary phosphonium salt, heteroaryl alkoxy silane, heteroaryl halide, or a combination thereof; and a fluid, wherein the aromatic compound includes a chemical group comprising: a first portion, the first portion being directly bonded to the silicate nanoparticle in the functionalized silicate nanoparticle; and a second portion comprising: an aromatic moiety, and the composition is effective to remove an aromatic compound from a substrate comprising a metal, composite, sand, rock, mineral, glass, formation, downhole element, or a combination thereof.

DETAILED DESCRIPTION

A detailed description of one or more embodiments is presented herein by way of exemplification and not limitation.

An asphaltene particle includes any collection of asphaltene molecules, for example, a micelle, precipitate, layered asphaltene molecules, aggregate, cluster, and the like. Interactions among the asphaltene molecules in an asphaltene particle can include hydrogen bonding, dipole-dipole interactions, and $\pi$-$\pi$ interactions. Without wishing to be bound by theory, disruption of these interactions can lead to exfoliation of an asphaltene molecule from the asphaltene particle. Since asphaltenes form layered aggregates that resemble the layered sheet structure of graphite, perturbing the layered asphaltene structure allows for asphaltene production from decomposed, e.g., exfoliated asphaltene aggregates. Such deagglomeration is useful for extraction of oil from an oil environment, e.g., a formation, as well as for restoration of the permeability of a plugged or flow-constricted reservoir. The methods and compositions herein are applicable to a multitude of environments such as downhole as well as to a ground environment.

It has been found that perturbing the internal structure of asphaltene particles, for example, in a micelle or other aggregate, can lead to increased quality of oil containing asphaltenes. Further, degradation of asphaltene aggregates herein enhances production of petroleum fluid in a downhole, subsurface, or ground environment. Furthermore, removal of asphaltene from pores of a rock formation, within a reservoir, or from a sidewall of a tubular, production tubing, borehole, or transportation tube can improve the permeability of such structures, leading to increased quality of oil as well as enhanced oil recovery from, e.g., a reservoir.

Moreover, without wishing to be bound by theory, it is believed that heteroatoms in the asphaltene structure interact strongly with various materials such as metals, minerals, and polar surfaces. Therefore, asphaltenes coat rock formations, sand, metal, and polymer components such as tubulars, sand screens, or packers. These deleterious adhesions lead to equipment malfunction, failure, or flow blockage. In order to alleviate this issue, a composition herein can separate and remove the asphaltene particles that interact, such as by adsorption or blockage, with such items or materials.

In an embodiment, a composition includes a functionalized silicate nanoparticle and a fluid. The functionalized silicate nanoparticle is a reaction product of a silicate nanoparticle and an aromatic compound. The aromatic compound includes a chemical group that has a first portion, e.g., a linker, and a second portion (e.g., a tail), which includes an aromatic moiety. The first portion is directly bonded to the silicate nanoparticle in the functionalized silicate nanoparticle. The composition is effective to remove an aromatic or olefin compound, e.g., an asphaltene, from a substrate. The substrate can be a metal, composite, sand, rock, mineral, glass, formation, downhole element, or a combination thereof.

As used herein, the term "aromatic" includes an aryl or heteroaryl group. Thus, the aromatic compound includes an aryl moiety or heteroaryl moiety.

The aromatic compound can have a structure of formula 1, formula 2, or formula 3:

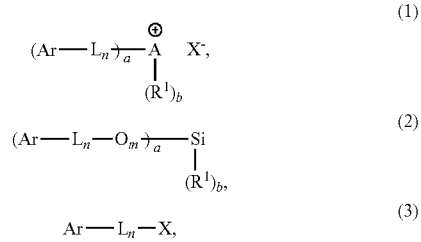

wherein
a is an integer from 1 to 4;
b is an integer from 0 to 3;
the sum of a and b is 4 (i.e., a+b=4) so that the valence of A and Si is completely filled and not exceeded
m and n independently are an integer from 0 to 20;
Ar is an aromatic moiety, wherein each Ar is the same or different, and Ar is independently a C6 to C30 aryl group, C3 to C30 heteroaryl, or combination thereof;
L is a linker group, wherein each L is the same or different, and L is independently a bond, C1 to C30 alkylene, C3 to C30 cycloalkenylene, C1 to C30 fluoroalkylene, C3 to C30 cycloalkylene, C3 to C30 heterocycloalkylene, C6 to C30 arylene, C6 to C40 aralkylene, C6 to C30 aryleneoxy, C3 to C30 heteroarylene, C6 to C40 heteroaralkylene, C2 to C30 alkenylene, C2 to C30 alkynylene, C1 to C30 amide, amine, C1 to C30 oxyalkylene, C1 to C30 oxyarylene, oxygen (O), sulfur (S), or a combination thereof. L can be substituted or unsubstituted (with the exception of O and S). Moreover, L can be linear or branched, with the exception of O and S.
A is nitrogen (N) or phosphorous (P);
$X^-$ is an anion of a halogen; and
$R^1$ is a substituent on A or Si, wherein each $R^1$ is the same or different, and $R^1$ independently is hydrogen, C1 to C30 alkyl group, C1 to C30 alkenyl group, C1 to C30 alkoxy group, C1 to C30 alkynyl group, C1 to C30 aryloxy, halogen, C6 to C30 aryl group, C1 to C30 amide, amino, C3-C30 cycloalkenyl, C3-C30 cycloalkyl, C3-C30 fluoroalkyl, C1-C30 heteroalkyl, C3-C30 heteroaryl, hydroxy, C1-C30 oxyalkyl, or a combination thereof, and each foregoing group can be substituted or unsubstituted or can be linear or branched.

As used herein, "alkenyl" refers to a straight or branched chain, monovalent C2-C10 hydrocarbon group having at least one carbon-carbon double bond (e.g., ethenyl ($-HC=CH^2$)). As used herein, "alkenylene" refers to a straight or branched chain, divalent C2-C30 hydrocarbon group having at least one carbon-carbon double bond (e.g., ethenylene ($-HC=CH-$)). As used herein, "alkoxy" refers to an alkyl group that is linked via an oxygen (i.e., $-O$-alkyl). Non-limiting examples of C1 to C30 alkoxy groups include methoxy groups, ethoxy groups, propoxy groups, isobutyloxy groups, sec-butyloxy groups, pentyloxy groups, isoamyloxy groups, and hexyloxy groups.

As used herein, "alkyl" refers to a straight or branched chain saturated aliphatic hydrocarbon having the specified number of carbon atoms, specifically 1 to 12 carbon atoms, more specifically 1 to 6 carbon atoms. Alkyl groups include, for example, groups having from 1 to 50 carbon atoms (C1 to C50 alkyl).

As used herein, "alkylene" refers to a straight, branched or cyclic divalent aliphatic hydrocarbon group, and can have from 1 to about 18 carbon atoms, more specifically 2 to about 12 carbons. Exemplary alkylene groups include methylene ($-CH_2-$), ethylene ($-CH_2CH_2-$), propylene ($-(CH_2)_3-$), cyclohexylene ($-C_6H_{10}-$), ethyleneoxy ($-CH_2CH_2O-$), methylenedioxy ($-O-CH_2-O-$), or ethylenedioxy ($-O-(CH_2)_2-O-$).

As used herein, "alkynyl" refers to a straight or branched chain, monovalent hydrocarbon group having at least one carbon-carbon triple bond (e.g., ethynyl). As used herein, "alkynylene" refers to a straight or branched chain divalent aliphatic hydrocarbon that has one or more unsaturated carbon-carbon bonds, at least one of which is a triple bond (e.g., ethynylene). As used herein, "amide" refers to a group of the formula $-C(O)-N(Rx)(Ry)$ or $-N-C(O)-Rx$, wherein Rx is an alkyl, an alkenyl, an alkynyl, a cycloalkyl, an aryl group, or heteroaryl group; and Ry is hydrogen or any of the groups listed for Rx. As used herein, "C1 to C15 amine group" is a group of the formula $-N(Rw)(Rz)$, wherein Rw is a C1 to C15 alkyl, a C1 to C15 alkenyl, a C1 to C15 alkynyl, a C3 to C15 cycloalkyl, a C6 to C15 aryl, or C3 to C15 heteroaryl group; and Rz is hydrogen or any of the groups listed for Rw.

As used herein, "aryl" refers to a cyclic moiety in which all ring members are carbon and at least one ring is aromatic, the moiety having the specified number of carbon atoms, specifically 6 to 24 carbon atoms, more specifically 6 to 12 carbon atoms. More than one ring may be present, and any additional rings may be independently aromatic, saturated or partially unsaturated, and may be fused, pendant, spirocyclic or a combination thereof.

As used herein, "arylalkylene" group is an aryl group linked via an alkylene moiety. The specified number of carbon atoms (e.g., C7 to C30) refers to the total number of carbon atoms present in both the aryl and the alkylene moieties. Representative arylalkyl groups include, for example, benzyl groups.

As used herein, "arylene" refers to a divalent radical formed by the removal of two hydrogen atoms from one or more rings of an aromatic hydrocarbon, wherein the hydrogen atoms may be removed from the same or different rings (preferably different rings), each of which rings may be aromatic or nonaromatic. As used herein, "aryloxy" refers to an aryl moiety that is linked via an oxygen (i.e., $-O$-aryl). As used herein, "cycloalkenyl" refers to a monovalent group having one or more rings and one or more carbon-carbon double bond in the ring, wherein all ring members are carbon (e.g., cyclopentyl and cyclohexyl).

As used herein, "cycloalkyl" refers to a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups. Cycloalkyl groups do not include an aromatic ring or a heterocyclic ring. When the numbers of carbon atoms is specified (e.g., C3 to C15 cycloalkyl), the number refers to the number of ring members present in the one or more rings.

As used herein, "cycloalkenylene" refers to a stable aliphatic 5-15-membered monocyclic or polycyclic, divalent radical having at least one carbon-carbon double bond, which comprises one or more rings connected or bridged together. Unless mentioned otherwise, the cycloalkenylene radical can be linked at any desired carbon atom provided that a stable structure is obtained. If the cycloalkenylene radical is substituted, this may be so at any desired carbon atom, once again provided that a stable structure is obtained. Examples thereof are cyclopentenylene, cyclohexenylene, cycloheptenylene, cyclooctenylene, cyclononenylene, cyclodecenylene, norbornenylene, 2-methylcyclopentenylene, 2-methylcyclooctenylene.

As used herein, "cycloalkylene" refers to a divalent radical formed by the removal of two hydrogen atoms from one or more rings of a cycloalkyl group (a nonaromatic hydrocarbon that comprises at least one ring).

As used herein, "fluoroalkyl" refers to an alkyl group in which at least one hydrogen is replaced with fluorine. "Fluoroalkylene" refers to an alkylene group in which at least one hydrogen is replaced with fluorine.

As used herein, "halogen" refers to one of the elements of group 17 of the periodic table (e.g., fluorine, chlorine, bromine, iodine, and astatine).

As used herein, the prefix "hetero" means that the compound or group includes a heteroatom (e.g., 1, 2, or 3 heteroatom(s)), wherein the heteroatom(s) is each independently N, O, S, Si, or P.

As used herein, "heteroalkyl" group is an alkyl group that comprises at least one heteroatom covalently bonded to one or more carbon atoms of the alkyl group. Each heteroatom is independently chosen from nitrogen (N), oxygen (O), sulfur (S), and phosphorus (P).

As used herein, "heteroaryl" refers to a monovalent carbocyclic ring group that includes one or more aromatic rings, in which at least one ring member (e.g., one, two or three ring members) is a heteroatom. In a C3 to C30 heteroaryl, the total number of ring carbon atoms ranges from 3 to 30, with remaining ring atoms being heteroatoms. Multiple rings, if present, may be pendent, spiro or fused. The heteroatom(s) are generally independently selected from nitrogen (N), oxygen (O), phosphorus (P), and sulfur (S).

As used herein, "heteroarylene" refers to a divalent radical formed by the removal of two hydrogen atoms from one or more rings of a heteroaryl moiety, wherein the hydrogen atoms may be removed from the same or different rings (preferably the same ring), each of which rings may be aromatic or nonaromatic.

As used herein, "oxyalkyl" refers to an alkyl group to which at least one oxygen atom is covalently attached (e.g., via a single bond, forming a hydroxyalkyl or ether group, or double bond, forming a ketone or aldehyde moiety). As used herein, "oxyalkylene" refers to a divalent radical comprising an alkylene group to which at least one oxygen atom is covalently attached (e.g., via a single bond, forming a hydroxyalkylene or an ether group, or double bond, forming a ketone or aldehyde moiety). As used herein, "oxyarylene" moiety is an aromatic group in which all ring members are independently chosen from carbon and oxygen.

As used herein, "substituted" means that the compound or group is substituted with at least one (e.g., 1, 2, 3, or 4) substituent independently selected from a hydroxyl (—OH), a C1-9 alkoxy, a C1-9 haloalkoxy, an oxo (=O), a nitro (—NO$_2$), a cyano (—CN), an amino (—NH$_2$), an azido (—N$_3$), an amidino (—C(=NH)NH$_2$), a hydrazino (—NHNH$_2$), a hydrazono (—C(=NNH$_2$)—), a carbonyl (—C(=O)—), a carbamoyl group (—C(O)NH$_2$), a sulfonyl (—S(=O)$_2$—), a thiol (—SH), a thiocyano (—SCN), a tosyl (CH$_3$C$_6$H$_4$SO$_2$—), a carboxylic acid C(=O)OH), a carboxylic C1 to C6 alkyl ester (—C(=O)OR wherein R is a C1 to C6 alkyl group), a carboxylic acid salt (—C(=O)OM) wherein M is an organic or inorganic anion, a sulfonic acid (—SO$_3$H$_2$), a sulfonic mono- or dibasic salt (—SO$_3$MH or —SO$_3$M$_2$ wherein M is an organic or inorganic anion), a phosphoric acid (—PO$_3$H$_2$), a phosphoric acid mono- or dibasic salt (—PO$_3$MH or —PO$_3$H$_2$ wherein M is an organic or inorganic anion), a C1 to C12 alkyl, a C3 to C12 cycloalkyl, a C2 to C12 alkenyl, a C5 to C12 cycloalkenyl, a C2 to C12 alkynyl, a C6 to C12 aryl, a C7 to C13 arylalkylene, a C4 to C12 heterocycloalkyl, and a C3 to C12 heteroaryl instead of hydrogen, provided that the substituted atom's normal valence is not exceeded.

The aromatic moiety of the aromatic compound can include an aryl group or heteroaryl group. Exemplary aryl groups include anthracyl, azulenyl, benzocyclooctenyl, benzocycloheptenyl, biphenylyl, chrysenyl, fluorenyl, indanyl, indenyl, naphthyl, pentalenyl, phenalenyl, phenanthrenyl, phenanthryl, phenyl, pyrenyl, tetrahydronaphthyl, a derivative thereof, or a combination thereof.

Exemplary heteroaryl groups include acridinyl, benzimidazolyl, benzofuranyl, benzofurazanyl, benzothiazolyl, benzothiophenyl, benzoxazolyl, carbazolyl, chromanyl, cinnolinyl, dibenzofuranyl, furazanyl, furopyridinyl, furyl, imidazolyl, indazolyl, indolinyl, indolizinyl, indolyl, isochromanyl, isoindolinyl, isoindolyl, isoquinolinyl, isothiazolyl, isoxazolyl, naphthyridinyl, oxadiazolyl, oxazolyl, perimidinyl, phenanthridinyl, phenanthrolinyl, phenazinyl, phenoxathiinyl, phenothiazinyl, phenoxazinyl, phthalazinyl, pteridinyl, purinyl, pyrazinyl, pyrazolyl, pyridazinyl, pyridinyl, pyrimidinyl, pyrrolyl, quinazolinyl, quinolinyl, quinoxalinyl, tetrazolyl, thiadiazolyl, thiazolyl, thienyl, triazinyl, triazolyl, a derivative thereof, or a combination thereof. The heteroaryl group may be attached at any heteroatom or carbon atom of the ring such that the result is a stable structure. Thus, for example, pyridyl represents 2-, 3-, or 4-pyridyl, thienyl represents 2- or 3-thienyl, and quinolinyl represents 2-, 3-, or 4-quinolinyl, and the like.

According to an embodiment, a substituent of the aromatic moiety (e.g., the aryl group or heteroaryl group) includes halogen, hydroxy, lower alkyl, lower alkoxy, lower aralkyl, —NR$^2_2$ (wherein R$^2$ is a lower alkyl), R$^3$CONH (wherein R$^3$ is phenyl or a lower alkyl), and —OC(O)R$^4$ (wherein R$^4$ is hydrogen, alkyl, or aralkyl). Other substituents for the aromatic moiety can be —OR$^5$, —OC(O)R$^5$, —NR$^5$R$^6$, —SR$^5$, —R$^5$, —CN, —NO$_2$, —CO$_2$R$^5$, —CONR$^5$R$^6$, —C(O)R$^5$, —OC(O)NR$^5$R$^6$, —NR$^6$C(O)R$^5$, —NR$^6$C(O)$_2$R$^5$, —NR$^5$—C(O)NR$^6$R$^7$, —NH—C(NH$_2$)=NH, —NR$^5$C(NH$_2$)=NH, —NH—C(NH$_2$)=NR$^5$, —S(O)R$^5$, —S(O)$_2$R$^5$, —S(O)$_2$NR$^5$R$^6$, —N$_3$, —CH(Ph)$_2$, perfluoro(C$_1$-C$_4$)alkoxy, and perfluoro(C$_1$-C$_4$)alkyl, in a number ranging from zero to the total number of open valences on the aromatic moiety ring system; and where R$^5$, R$^6$, and R$^7$ are independently selected from hydrogen, C1-C8 alkyl or heteroalkyl, unsubstituted aryl and heteroaryl, (unsubstituted aryl)-(C1-C4)alkyl, (unsubstituted aryl)oxy-(C1-C4)alkyl, (unsubstituted heteroaryl)-(C1-C4)alkyl, or (unsubstituted heteroaryl)oxy-(C1-C4)alkyl.

In a specific embodiment, a substituent for the aromatic moiety of the aromatic compound includes, for example, an alkyl group (having 1 to 20 carbon atoms, specifically 1 to 12 carbon atoms, and more specifically 1 to 8 carbon atoms and including, e.g., methyl, ethyl, iso-propyl, tert-butyl, n-octyl, n-decyl, n-hexadecyl, cyclopropyl, cyclopentyl, cyclohexyl, and the like), an aryl group (having 6 to 30 nuclear carbon atoms, specifically 6 to 20 nuclear carbon atoms and including, for example, phenyl, naphthyl, biphenylyl, anthranyl, phenanthryl, pyrenyl, chrysenyl, fluorenyl, and the like), an alkenyl group (having 2 to 20 carbon atoms, specifically 2 to 12 carbon atoms, and more specifically 2 to 8 carbon atoms and including, for example, vinyl, allyl, 2-butenyl, 3-pentenyl, and the like), an alkynyl group (having 2 to 20 carbon atoms, specifically 2 to 12 carbon atoms, and more specifically 2 to 8 carbon atoms and including, for example, propargyl, 3-pentynyl, and the like), an amino group (having 0 to 20 carbon atoms, specifically 0 to 12 carbon atoms, and more specifically 0 to 6 carbon atoms and including, for example, amino, methylamino, dimethylamino, diethylamino, diphenylamino, dibenzylamino, and the like), an alkoxy group (having 1 to 20 carbon atoms, specifically 1 to 12 carbon atoms, and more specifically 1 to 8 carbon atoms and including, for example, methoxy, ethoxy, butoxy, and the like), an aryloxy group (having 6 to 20 carbon atoms, specifically 6 to 16 carbon atoms, and more specifically 6 to 12 carbon atoms and including, for example, phenyloxy, 2-naphthyloxy, and the like), an acyl group (having 1 to 20 carbon atoms, specifically 1 to 16 carbon atoms, and more specifically 1 to 12 carbon atoms and including, for example, acetyl, benzoyl, formyl, pivaloyl, and the like), an alkoxycarbonyl group (having 2 to 20 carbon atoms, specifically 2 to 16 carbon atoms, and more specifically 2 to 12 carbon atoms and including, for example, methoxycarbonyl, ethoxycarbonyl, and the like), an aryloxycarbonyl group (having 7 to 20 carbon atoms, specifically 7 to 16 carbon atoms, and more specifically 7 to 10 carbon atoms and including, for example, phenyloxycarbonyl and the like), an acyloxy group (having 2 to 20 carbon atoms, specifically 2 to 16 carbon atoms, and more specifically 2 to 10 carbon atoms and including, for example, acetoxy, benzoyloxy, and the like), an acylamino group (having 2 to 20 carbon atoms, specifically 2 to 16 carbon atoms, and more specifically 2 to 10 carbon atoms and including, for example, acetylamino, benzoylamino, and the like), an alkoxycarbonylamino group (having 2 to 20 carbon atoms, specifically 2 to 16 carbon atoms, and more specifically 2 to 12 carbon atoms and including, for example, methoxycarbonylamino and the like), an aryloxycarbonylamino group (having 7 to 20 carbon atoms, specifically 7 to 16 carbon atoms, and more specifically 7 to 12 carbon atoms and including, for example, phenyloxycarbonylamino and the like), a sulfonylamino group (having 1 to 20 carbon atoms, specifically 1 to 16 carbon atoms, and more specifically 1 to 12 carbon atoms and including, for example, methanesulfonylamino, benzenesulfonylamino, and the like), a sulfamoyl group (having 0 to 20 carbon atoms, specifically 0 to 16 carbon atoms and more specifically 0 to 12 carbon atoms and including, for example, sulfamoyl, methylsulfamoyl, dimethylsulfamoyl, phenylsulfamoyl, and the like), a carbamoyl group (having 1 to 20 carbon atoms, specifically 1 to 16 carbon atoms and more specifically 1 to 12 carbon atoms and including, for example, carbamoyl, methylcarbamoyl, diethylcarbamoyl, phenylcarbamoyl, and the like), an alkylthio group (having 1 to 20 carbon atoms, specifically 1 to 12 carbon atoms, and more specifically 1 to 8 carbon atoms and including, for example, methylthio, ethylthio, and the like), an arylthio group (having 6 to 20 carbon atoms, specifically 6 to 16 carbon atoms, and more specifically 6 to 12 carbon atoms and including, for example, phenylthio and the like), a sulfonyl group (having 1 to 20 carbon atoms, specifically 1 to 16 carbon atoms and more specifically 1 to 12 carbon atoms and including, for example, mesyl, tosyl, and the like), a sulfinyl group (having 1 to 20 carbon atoms, specifically 1 to 16 carbon atoms, and more specifically 1 to 12 carbon atoms and including, for example, methanesulfinyl, benzenesulfinyl, and the like), a ureido group (having 1 to 20 carbon atoms, specifically 1 to 16 carbon atoms, and more specifically 1 to 12 carbon atoms and including, for example, ureido, methylureido, phenylureido, and the like), a phosphoramide group (having 1 to 20 carbon atoms, specifically 1 to 16 carbon atoms, and more specifically 1 to 12 carbon atoms and including, for example, diethylphosphoramide, phenylphosphoramide, and the like), a hydroxy group, a mercapto group, a halogen atom (for example, a fluorine atom, chlorine atom, bromine atom, iodine atom, and the like), a cyano group, a sulfo group, a carboxyl group, a nitro group, a hydroxamic acid, a sulfino group, a hydrazine group, an imino group, a heterocyclic group (having 1 to 30 carbon atoms, specifically 1 to 12 carbon atoms, including, for example, a nitrogen atom, an oxygen atom and a sulfur atom as a heteroatom and including, for example, imidazolyl, pyridyl, quinolyl, furyl, thienyl, piperidyl, morpholino, benzoxazolyl, benzimidazolyl, benzothiazolyl and carbazolyl), a silyl group (having 3 to 40 carbon atoms, specifically 3 to 30 carbon atoms, and more specifically 3 to 24 carbon atoms and including, for example, trimethylsilyl, triphenylsilyl, and the like), and the like.

In an embodiment, the R group of formula (1), (2), or (3) is one of the preceding substituents mentioned with the respect to the aromatic moiety.

In an embodiment, the linking groups of formula (1), (2), or (3) include groups obtained by converting the preceding substituents mentioned above with the respect to the aromatic moiety into divalent groups. Exemplary linking groups are a hetero atom, a substituted or unsubstituted alkylene group having 1 to 6 carbon atoms, a substituted or unsubstituted cycloalkylene group having 3 to 30 carbon atoms, a substituted or unsubstituted arylene group having 6 to 30 nuclear carbon atoms, or a substituted or unsubstituted heteroarylene group having 5 to 30 nuclear carbon atoms. The heteroatom can be, for example, an oxygen atom, a sulfur atom, a nitrogen atom and a silicon atom. The alkylene group can be, for example, methylene, ethylene, propylene, butylene, pentylene, hexylene, heptylene, octylene, dimethylmethylene, diphenylmethylene, and the like. The cycloalkylene group can be, for example, cyclopropylene, cyclobutylene, cyclopentylene and cyclohexylene, 1,1-cyclohexylene, and the like. The arylene group can be, for example, phenylene, biphenylene, terphenylene, naphthylene, anthracenylene, phenathrylene, chrysenylene, pyrenylene, fluorenylene, 2,6-diphenylnaphthalene-4',4"-ene, 2-phenylnaphthalene-2,4'-ene, fluorenylene, and the like. The heteroarylene group can be, for example, a divalent residue of imidazole, benzimidazole, pyrrole, furan, thiophene, benzothiophene, oxadiazoline, indoline, carbazole, pyridine, quinoline, isoquinoline, benzoquinone, pyrrolidine, imidazolidine, piperidine, pyridylene, and the like.

According to an embodiment, the aromatic compound can be an aryl quaternary ammonium salt, aryl quaternary phosphonium salt, aryl alkoxy silane, aryl halide, heteroaryl quaternary ammonium salt, heteroaryl quaternary phosphonium salt, heteroaryl alkoxy silane, heteroaryl halide, or the like.

Non-limiting examples of the aryl quaternary ammonium salt include benzylammonium chloride, benzyldimethyldecylammonium chloride, benzyldimethyldodecylammonium chloride, benzyldimethylhexadecylammonium chloride, benzyldimethylhexylammonium chloride, benzyldimethyl (2-hydro xyethyl)ammonium chloride, benzyldimethyl(2-hydroxymethyl) ammonium chloride, benzyldimethyloctylammonium chloride, benzyldimethylstearylammonium chloride monohydrate, benzyldimethyltetradecylammonium chloride, benzyldodecyldimethylammonium bromide, benzyltributylammonium bromide, benzyltributylammonium chloride, benzyltributylammonium iodide, benzyltriethylammonium bromide, benzyltriethylammonium chloride, benzyltrimethylammonium bromide, benzyltrimethylammonium dichloroiodate, bis(triphenylphosphoranylidene) ammonium chloride, (dodecyldimethyl-2-phenoxyethyl) ammonium bromide, (diisobutylphenoxyethoxyethyl) dimethylbenzylammonium chloride, (4-nitrobenzyl) trimethylammonium chloride, trimethylphenylammonium bromide, trimethylphenylammonium chloride, (vinylbenzyl) trimethylammonium chloride, 3-benzyl-5-(2-hydroxyethyl)-4-methylthiazolium chloride, 1,1-dimethyl-4-phenylpiperazinium iodide, and the like. In an embodiment, the aryl compound is an aryl phosphine such as one of the aforementioned phosphines and the like. In an embodiment, the heteroaryl quaternary ammonium salt includes a heteroaryl group instead of the aryl group in the aryl quaternary ammonium salt here. Exemplary heteroaryl quaternary ammonium salts include pyridyl(methyl)ammonium chloride (bromide, iodide), chinolinyl(methyl)ammonium chloride (bromide, iodide), benzothiophenyl(methyl)ammonium chloride (bromide, iodide), and the like.

Exemplary aryl quaternary phosphonium salts include benzyltriphenylphosphonium chloride, dimethyldiphenylphosphonium iodide, ethyltriphenylphosphonium iodide, methyltriphenoxyphosphonium iodide, tetraphenylphosphonium bromide, and the like, additional quaternary phosphonium salts includes those derived from commercially available (Sigma Aldrich co.) phosphines such as substituted or unsubstituted triphenylphosphine, naphthyldiphenylphosphine, dinaphthylphenylphosphine, trinaphthylphosphine, 9-anthryldiphenylphosphine, 9-anthryldinaphthylphosphine, diphenylpyrenylphosphine, dinaphthylpyrenylphosphine, bis(pentafluorophenyl)phenylphosphine, (4-bromophenyl) diphenylphosphine, 4-(dimethylamino)phenyldiphenylphosphine, diphenyl(2-methoxyphenyl)phosphine, diphenyl(pentafluorophenyl)phosphine, 2-(diphenylphosphino) benzaldehyde, diphenyl-2-pyridylphosphine, diphenyl(p-tolyl)phosphine, tri-2-furylphosphine, tris(4-chlorophenyl) phosphine, tris(2,6-dimethoxyphenyl)phosphine, tris(4-fluorophenyl)-phosphine, tris(3-methoxyphenyl)phosphine, tris(4-methoxyphenyl)phosphine, tris(pentafluoro-phenyl) phosphine, tris(2,4,6-trimethoxyphenyl)phosphine, tris(2,4,6-trimethylphenyl)phosphine, 2-(diphenylphosphino)benzoic acid, 4-(diphenylphosphino)benzoic acid, 4,4'-(phenylphosphinidene)bis(benzenesulfonic acid), 3,3',3''-phosphinidynetris(benzenesulfonic acid), tri-m-tolylphosphine, tri-o-tolylphosphine, tri-p-tolylphosphine, (1,2-bis(diphenyl-phosphino)benzene), (2,2'-bis(diphenylphosphino)-1,1'-binaphthyl, and the like. These phosphines can be processed to produce aryl quaternary phosphonium salts as described in U.S. patent application Ser. No. 10/553,307, the disclosure of which is incorporated herein in its entirety. In an embodiment, the heteroaryl quaternary phosphonium salt includes a heteroaryl group instead of the aryl group in the aryl quaternary phosphonium salts here. Exemplary heteroaryl quaternary phosphonium salts include pyridyl(methyl)phosphonium chloride (bromide, iodide), chinolinyl(methyl)phosphonium chloride (bromide, iodide), benzothiophenyl(methyl)phosphonium chloride (bromide, iodide), and the like.

The anion $X^-$ of the aromatic compound of formula (1) (e.g., the aryl quaternary ammonium salt, heteroaryl quaternary ammonium salt, aryl quaternary phosphonium salt, or heteroaryl quaternary phosphonium salt) can be a halide, triflate, sulfate, nitrate, hydroxide, carbonate, bicarbonate, acetate, phosphate, oxalate, cyanide, aklylcarboxylate, N-hydroxysuccinimide, N-hydroxybenzotriazole, alkoxide, thioalkoxide, alkane sulfonyloxide, halogenated alkane sulfonyloxide, arylsulfonyloxide, heteroarylsulfonyloxide bisulfate, valerate, oleate, palmitate, stearate, laurate, borate, benzoate, lactate, citrate, maleate, fumarate, succinate, tartrate, naphthylate, mesylate, glucoheptonate, lactobionate, and the like.

Exemplary aryl alkoxy silanes includes tert-butoxy (chloro)diphenylsilane, aminophenyltrimethoxysilane, 2-(4-pyridylethyl)triethoxysilane, 2-(trimethoxysilylethyl)pyridine, n-(3-trimethoxysilylpropyl)pyrrole, 3-(m-aminophenoxy)propyltrimethoxy-silane, n-phenylaminopropyltrimethoxy-silane, (phenylaminomethyl)methyl-dimethoxysilane, n-phenylaminomethyltriethoxysilane, 3-(n-styrylmethyl-2-aminoethylamino)-propyltrimethoxysilane hydrochloride, (2-n-benzylaminoethyl)-3-aminopropyl-trimethoxysilane hydrochloride, n-(3-triethoxysilylpropyl)-4,5-dihydroimidazole, 2-(2-pyridylethyl)thiopropyltrimethoxysilane, 2-(4-pyridylethyl) thiopropyltrimethoxysilane, benzoyloxypropyltrimethoxysilane, ((chloromethyl)phenylethyl)-trimethoxysilane, (p-chloromethyl)phenyltrimethoxysilane, ((chloromethyl)phenylethyl)-methyldimethoxysilane, bis(2-diphenylphosphinoethyl)-methylsilylethyltriethoxysilane, diphenylphosphinoethyldimethyl-ethoxysilane, 2-(diphenylphosphino)ethyl-triethoxysilane, 2-(2-pyridylethyl)thiopropyltrimethoxysilane, 2-(4-pyridylethyl)thiopropyltrimethoxysilane, 2-(3-trimethoxysilylpropylthio)-thiophene, 3-(n-styrylmethyl-2-aminoethylamino)-propyltrimethoxysilane, (3-cyclopentadienylpropyl)triethoxysilane, styrylethyltrimethoxysilane, 3-(2,4-dinitrophenylamino)propyl-triethoxysilane, 2-hydroxy-4-(3-methyldiethoxysilyl-propoxy) diphenylketone, 2-hydroxy-4-(3-triethoxysilylpropoxy)-diphenylketone, o-4-methylcoumarinyl-n-[3-(triethoxysilyl)propyl]carbamate, 7-triethoxysilylpropoxy-5-hydroxyflavone, 5-dimethylamino-n-(3-triethoxysilylpropyl)-napthalene-1-sulfonamide, 2-(2-triethoxysilylpropoxy-5-methyl-phenyl)benzotriazole, 3-(triethoxysilylpropyl)-p-nitro-benzamide, (R)-n-triethoxysilylpropyl-o-quinineurethane, (R)-n-1-phenyl ethyl-n'-triethoxysilyl-propylurea, (S)-n-1-phenylethyl-n'-triethoxysilyl-propylurea, and the like available from Gelest Inc, Morrisville, Pa. In an embodiment, the heteroaryl alkoxy silanes include a heteroaryl group instead of the aryl group in the aryl alkoxy silane compounds here. Exemplary heteroaryl alkoxy silanes include pyridylmethyltriethoxy silane, furylethyltriethoxysilane, thiophenylethyltriethoxy silane, and the like.

Exemplary aryl halides include phenyl chloride, 2-chlorotoluene, 2-bromotoluene, 4-chlorotoluene, 4-bromotoluene, 2-chloro-4-methylnaphthalene, 2-bromo-4-methylnaphthalene, 4-chloroanisole, 4-bromoanisole, 2-chlorobenzyl(2-methoxy)ethyl ether, 2-bromobenzyl(2-methoxy)ethyl ether, 2-chlorobenzyl methyl ether, 2-bromobenzyl methyl ether, 2-chlorobenzyl ethyl ether, 2-bromobenzyl ethyl ether, chlorobenzene, bromobenzene, iodobenzene, fluorobenzene, dichlorobenzene, trichlorobenzene, chlorotoluene, 2,4-dichlorotoluene, chloronaphthalene, bromonaphthalene, iodotoluenes, iodonaphthalene, 2-bromo-6-methoxynaphthalene, 4-bromo-isobutylbenzene, triphenylmethane chloride, iodobenzene, bromotoluene, iodonaphthalene, chlorobenzene, phenylphosphine dichloride, diphenylphosphine mono chloride, (o-chlorophenyl)phosphine dichloride, bis(o-chlorophenyl)phosphine monochloride, 1-naphthylphosphine bromides, chlorotolylphosphine chlorides, dichlorotolylphosphine chlorides, and the like. In an embodiment, the heteroaryl halide includes a heteroaryl group instead of the aryl group in the aryl halide compounds here, e.g., 2,6-dichloropyridine. Exemplary heteroaryl halides include pyridylethyl chloride, furylethyl chloride, thiophenylethyl chloride, and the like.

In the composition, the functionalized silicate nanoparticle includes a silicate nanoparticle. The silicate nanoparticle contains silicon and oxygen that can be arranged in various structures such as a tetrahedral configuration and can have a shape such as a platelet, sphere, polyhedron, a combination thereof, and the like. According to an embodiment, the silicate nanoparticle comprises a silsesquioxane, cyclosilicate, inosilicate, nesosilicate, phyllosilicate, sorosilicate, tectosilicate, or a combination thereof.

The silicate nanoparticles, from which the composition is formed, are generally particles having an average particle size, in at least one dimension, of less than one micrometer (μm). As used herein "average particle size" refers to the number average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. Silicate nanoparticles can include both particles having an average particle size of 250 nm or less, and particles having an average particle size of greater than 250 nm to less than 1 μm (sometimes referred in the art as "sub-micron sized" particles). In an embodiment, a silicate nanoparticle can have an average particle size of about 0.1 nanometers (nm) to about 500 nm, specifically 0.5 nm to 250 nm, more specifically about 1 nm to about 150 nm, more specifically about 1 nm to about 125 nm, and still more specifically about 1 nm to about 75 nm. The silicate nanoparticles may be monodisperse, where all particles are of the same size with little variation, or polydisperse, where the particles have a range of sizes and are averaged. Generally, polydisperse silicate nanoparticles are used. Silicate nanoparticles of different average particle size may be used, and in this way, the particle size distribution of the silicate nanoparticles can be unimodal (exhibiting a single size distribution), bimodal (exhibiting two size distributions), or multi-modal (exhibiting more than one particle size distribution).

The minimum particle size for the smallest 5 percent of the silicate nanoparticles can be less than 2 nm, specifically less than or equal to 1 nm, and more specifically less than or equal to 0.5 nm. Similarly, the maximum particle size for 95% of the silicate nanoparticles can be greater than or equal to 900 nm, specifically greater than or equal to 750 nm, and more specifically greater than or equal to 500 nm. The silicate nanoparticles can have a high surface area of greater than 300 $m^2/g$, and in a specific embodiment, 300 $m^2/g$ to 1800 $m^2/g$, specifically 500 $m^2/g$ to 1500 $m^2/g$. In a particular embodiment, the silsesquioxane has a size from 0.5 nm to 10 nm.

According to an embodiment, the silicate nanoparticle is a silsesquioxane. Silsesquioxanes, also referred to as polysilsesquioxanes, polyorganosilsesquioxanes, or polyhedral oligomeric silsesquioxanes (POSS), are polyorganosilicon oxide compounds of general formula $RSiO_{1.5}$ (where R is a hydrogen, inorganic group, or organic group) having defined closed or open cage structures (closo or nido structures, which are called respectively completely condensed or incompletely condensed structures). Silsesquioxanes can be prepared by acid and/or base-catalyzed condensation of functionalized silicon-containing monomers such as tetraalkoxysilanes including tetramethoxysilane and tetraethoxysilane, alkyltrialkoxysilanes such as methyltrimethoxysilane and methyltrimethoxysilane, as well as other groups.

In an embodiment, the silsesquioxane has a closed cage structure, an open cage structure, or a combination thereof. The silsesquioxane can have any shape of cage structure such as cubes, hexagonal prisms, octagonal prisms, decagonal prisms, dodecagonal prisms, and the like. Additionally, the cage structure of the silsesquioxane comprises from 4 to 30 silicon atoms, specifically, 4 to 20 silicon atoms, and more specifically 4 to 16 silicon atoms, with each silicon atom in the cage structure being bonded to oxygen. It should be noted that the term "cage structure" is meant to include the $SiO_{1.5}$ portion of the general silsesquioxane formula RSiO1.5, and not the R-group.

According to an embodiment, the silsesquioxane comprises a functional group bonded to a silicone atom of the silsesquioxane. In a specific embodiment, the functional group bonded to the silicon atom comprises an alkyl, alkoxy, haloakyl, cycloalkyl, heterocycloalkyl, cycloalkyloxy, aryl, aralkyl, aryloxy, aralkyloxy, heteroaryl, heteroaralkyl, alkenyl, alkynyl, amine, alkyleneamine, aryleneamine, alkenyleneamine, hydroxy, carboxyl, ether, epoxy, ketone, halogen, hydrogen, or a combination thereof. Thus, the silsesquioxane derivatized with a functional group includes a group such as an alcohol, amine, carboxylic acid, epoxy, ether, fluoroalkyl, halide, imide, ketone, methacrylate, acrylate, silica, nitrile, norbornenyl, olefin, polyethylene glycol (PEG), silane, silanol, sulfonate, thiol, and the like. Furthermore, the silsesquioxane can have from one functional group to as many functional groups as there are silicon atoms in the cage structure of the silsesquioxane. In a specific embodiment, the silsesquioxane is a derivatized octasilsesquioxane $R_{8-n}H_n(SiO_{1.5})_8$ (where 0≤n≤8, and R can be a same or different functional group), and the number of functional groups varies with the number of silicon atoms in the cage structure, i.e., from 0 to 8 functional groups.

Exemplary silsesquioxanes having a closed cage structure include 1-allyl-3,5,7,9,11,13,15-heptacyclopentylpentacyclo[9.5.1.1(3,9).1(5,15).1(7,13)]octasiloxane; 1-allyl-3,5,7,9,11,13,15-heptaisobutylpentacyclo[9.5.1.1(3,9).1(5,15).1(7,13)]octasiloxane; 1-[3-(2-aminoethyl)amino]propyl-3,5,7,9,11,13,15-isobutylpentacyclo[9.5.1.1(3,9).1(5,15).1(7,13)]octasiloxane; 1-chlorobenzylethyl-3,5,7,9,11,13,15-heptaisobutylpentacyclo[9.5.1.1(3,9).1(5,15).1(7,13)]octasiloxane; 1-(4-chlorobenzyl)-3,5,7,9,11,13,15-heptacyclopentylpentacyclo[9.5.1.1(3,9).1(5,15).1(7,13)]octasiloxane; 1-chloropropyl-3,5,7,9,11,13,15-isobutylpentacyclo[9.5.1.1(3,9).1(5,15).1(7,13)]octasiloxane; (cyanopropyldimethylsilyloxy)heptacyclopentylpentacyclooctasiloxane; 1-(2-transcyclohexanediol)ethyl-3,5,7,9,11,13,15-isobutylpentacyclo[9.5.1.1(3,9).1(5,15).1(7,13)]octasiloxane; 1-(3-cyclohexen-1-yl)-3,5,7,9,11,13,15-heptacyclopentylpentacyclo[9.5.1.1 (3,9).1(5,15).1(7,13)]octasiloxane; dodecaphenyl-dodecasiloxane; 1-[2-(3,4-epoxycyclohexyl)ethyl]-3,5,7,9,11,13,15-isobutylpentacyclo[9.5.1.1(3,9).1(5,15).1(7,13)]octasiloxane; 1,3,5,7,9,11,13-heptacyclopentyl-15-glycidylpentacyclo[9.5.1.1(3,9).1(5,15).1(7,13)]octasiloxane; 1-(3-glycidyl)propoxy-3,5,7,9,11,13,15-isobutylpentacyclo[9.5.1.1(3,9).1(5,15).1(7,13)]octasiloxane; octakis(tetramethylammonium) pentacyclo[9.5.1.1(3,9).1(5,15).1(7,13)]octasiloxane-1,3,5,7,9,11,13,15-octakis(yloxide) hydrate; 3-hydroxypropylheptaisobutyloctasiloxane; 1-(3-mercapto)propyl-3,5,7,9,11,13,15-isobutylpentacyclo[9.5.1.1 (3,9).1(5,15).1(7,13)]octasiloxane; octacyclohexenylethyldimethylsilyloxy-octasiloxane; 1,3,5,7,9,11,13,15-octacyclohexylpentacyclooctasiloxane; octa[(1,2-epoxy-4-ethylcyclohexyl)dimethylsiloxy]octasiloxane; octa[(3-glycidyloxypropyl)dimethylsiloxy]octasiloxane; octa[(3-hydroxypropyl)dimethylsiloxy]octasiloxane; 1,3,5,7,9,11, 13,15-octakis[2-(chlorodimethylsilyl)ethyl]pentacyclo[9.5.1.1(3,9).1(5,15).1(7,13)]octasiloxane; 1,3,5,7,9,11,13,15-octakis(dimethylsilyloxy)pentacyclo[9.5.1.1(3,9).1(5,15).1(7,13)]octasiloxane; 1,3,5,7,9,11,13,15-octamethylpentacyclo[9.5.1.1(3,9).1(5,15).1(7,13)]octasiloxane; 1,3,5,7,9,11,13,15-octaphenylpentacyclo[9.5.1.1(3,9).1(5,15).1(7,13)]octasiloxane; 1,3,5,7,9,11,13,15-octa(2-trichlorosilyl)ethyl)pentacyclo[9.5.1.1(3,9).1(5,15).1(7,13)]octasiloxane; 1,3,5,7,9,11,13,15-octavinylpentacyclo[9.5.1.1 (3,9).1 (5,15).1 (7,13)] octasiloxane; 1-(2,3-propanediol)propoxy-3,5,7,9,11,13,15-isobutylpentacyclo-[9.5.1.1(3,9).1(5,15).1(7,13)] octasiloxane; 3-(3,5,7,9,11,13,15-heptaisobuty lpentacyclo[9.5.1.1(3,9).1(5,15).1(7,13)]octasiloxan-1-yl) propylmethacrylate; (3-tosyloxypropyl)-heptaisobutyloctasiloxane; 1-(trivinylsilyloxy)-3,5,7,9,11,13,15-heptacyclopentylpentacyclo[9.5.1.1(3,9).1(5,15).1(7,13)]octasiloxane; 1-vinyl-3,5,7,9,11,13,15-isobutylpentacyclo[9.5.1.1(3,9).1(5,15).1(7,13)]octasiloxane, (3-(2,2-bis(hydroxymethyl)butoxy)propyl) dimethylsiloxy-3,5,7,9,11,13,15-isobutylpentacyclo[9.5.1.1.(3,9).1(5,15).1(7,13)]octasiloxane; octa(3-hydroxy-3-methylbutyldimethylsiloxy)octasiloxane; 1-(3-amino)propyl-3,5,7,9,11,13,15-isobutylpentacyclo[9.5.1.1.(3,9).1 (5,15).1(7,13)]octasiloxane; 1-(3-amino)propyl-3,5,7,9,11,13,15-isooctylpentacyclo[9.5.1.1.(3,9).1(5,15).1(7,13)] octasiloxane; 1,3,5,7,9,11,13,15-octaaminophenylpentacyclo[9.5.1.1(3,9).1(5,15).1(7,13)] octasiloxane; octa-n-phenylaminopropyl)-octasiloxane; n-methylaminopropyl-heptaisobutyl-octasiloxane; octaethylammoniumoctasiloxane chloride; 1-(4-amino)phenyl-3,5,7,9,11,13,15-cyclohexlpentacyclo[9.5.1.1(3,9).1(5,15).1(7,13)]octasiloxane; 1-(amino)phenyl-3,5,7,9,11,13,15-cyclohexlpentacyclo[9.5.1.1(3,9).1(5,15).1(7,13)] octasiloxane; 1-(4-amino)phenyl-3,5,7,9,11,13,15-heptaisobutylpentacyclo[9.5.1.1(3,9).1(5,15).1(7,13)] octasiloxane; 1-(amino)phenyl-3,5,7,9,11,13,15-heptaisobutylpentacylco[9.5.1.1(3,9).1(5,15).1(7,13)] octasiloxane; 1-[(3-maleamic acid)propyl]-3,5,7,9,11,13,15-heptacyclohexylpentacyclo[9.5.1.1(3,9).1(5,15).1(7,13)]-octasiloxane; 1-[(3-maleamic acid)propyl]-3,5,7,9,11,13,15-heptaisobutylpentacyclo[9.5.1.1(3,9).1(5,15).1(7,13)]-octasiloxane; octamaleamic acid octasiloxane; trimethoxy-[2-(7-oxabicyclo[4.1.0]hept-3-yl)ethyl]silane, hydrolyzed; 2-[[3-(trimethoxysilyl)propoxy]methyl]-oxirane, hydrolyzed; ethyl 3,5,7,9,11,13,15-heptaethylpentacyclo[9.5.1.1(3,9).1(5,15).1(7,13)]octasiloxane-1-undecanoate; 1-(3-glycidyl)propoxy-3,5,7,9,11,13,15-isooctylpentacyclo[9.5.1.1 (3,9).1(5,15).1(7,13)]octasiloxane; 3,7,14-tris{[3-(epoxypropoxy)propyl]dimethylsilyloxy}-1,3,5,7,9,11,14-heptacyclohexyltricyclo[7.3.3.1(5,11)]heptasiloxane; 3,7,14-tris{[3-(epoxypropoxy)propyl]dimethylsilyloxy}-1,3,5,7,9,11,14-heptaisobutyltricyclo[7.3.3.1(5,11)]heptasiloxane; octatrifluoropropyloctasiloxane; endo-3,7,14-trifluoropropyl-1,3,5,7,9,11,14-heptaisobutyltricyclo[7.3.3.1(5,11)]heptasiloxane; 1-chlorobenzyl-3,5,7,9,11,13,15-heptaisobutylpentacyclo[9.5.1.1(3,9).1(5,15).1(7,13)] octasiloxane; 1,3,5,7,9,11,13,15-octakis(1,2-dibromoethyl)-pentacyclo[9.5.1.1(3,9).1(5,15).1(7,13)]octasiloxane; 1-[(3-maleimide)propyl]-3,5,7,9,11,13,15-heptacyclohexylpentacyclo[9.5.1.1(3,9).1(5,15).1(7,13)]-octasiloxane; 1-[(3-maleimide)propyl]-3,5,7,9,11,13,15-heptaisobutylpentacyclo[9.5.1.1(3,9).1(5,15).1(7,13)]-octasiloxane; 3-(3,5,7,9,11,13,15-heptaisobutylpentacyclo[9.5.1.1(3,9).1(5,15).1 (7,13)]octasiloxan-1-yl) propylacrylate; 3-[3,5,7,9,11,13,15-heptacyclohexylpentacyclo[9.5.1.1(3,9).1(5,15).1(7,13)] octasiloxan-1-yl]methylmethacrylate; 3-[3,5,7,9,11,13,15-heptaisobutylpentacyclo[9.5.1.1(3,9).1(5,15).1(7,13)] octasiloxan-1-yl]methylmethacrylate; 3-[3,5,7,9,11,13,15-heptaethylpentacyclo[9.5.1.1(3,9).1(5,15).1(7,13)] octasiloxan-1-yl]methylmethacrylate; 3-[3,5,7,9,11,13,15-heptaethylpentacyclo[9.5.1.1(3,9).1(5,15).1(7,13)] octasiloxan-1-yl]propylmethacrylate; 3-[3,5,7,9,11,13,15-heptaisooctylpentacyclo[9.5.1.1(3,9).1(5,15).1(7,13)] octasiloxan-1yl]methylmethacrylate; 3-(3,5,7,9,11,13,15-heptaisooctylpentacyclo[9.5.1.1 (3,9).1(5,15).1(7,13)] octasiloxan-1-yl)propylmethacrylate; 3-(3,5,7,9,11,13,15-heptaphenylpentacyclo[9.5.1.1(3,9).1(5,15).1(7,13)] octasiloxan-1-yl)propylmethacrylate; octasiloxa-octapropylmethacrylate; octasiloxa-octapropylacrylate; dodecaphenyldecasiloxane; octaisooctyloctasiloxane; phenylheptaisobutyloctasiloxane; phenylheptaisooctyloctasiloxane; isooctylhetpaphenyloctasiloxane; octaisobutyloctasiloxane; octamethyloctasiloxane; octaphenyloctasiloxane; octakis(tetramethylammonium)pentacyclo[9.5.1.1 (3,9).1 (5,15).1 (7,13)]octasiloxane 1,3,5,7,9,11,13,15-octakis(cyloxide)hydrate; octakis(trimethylsiloxy)pentacyclo[9.5.1.1 (3,9).1(5,15).1(7,13)]octasiloxane; 3,5,7,9,11,13,15-heptaisobutylpentacyclo[9.5.1.1(3,9).1(5,15).1(7,13)] octasiloxane-1-butyronitrile; 1-[2-(5-norbornen-2-yl)ethyl]-3,5,7,9,11,13,15-heptaethylpentacyclo[9.5.1.1(3,9).1 (7,13)] octasiloxane; 1-[2-(5-norbornen-2-yl)ethyl]-3,5,7,9,11,13,15-heptaisobutylpentacyclo[9.5.1.1(3,9).1(7,13)] octasiloxane; 1-allyl-3,5,7,9,11,13,15-heptaisobutylpentacyclo[9.5.1.1(3,9).1(7,13)]octasiloxane; 1,3,5,7,9,11,13-heptaisobutyl-15-vinylpentacyclo[9.5.1.1 (3,9).1 (5,15).1 (7,13)]octasiloxane; 1,3,5,7,9,11,13,15-octa [2-(3-cyclohexenyl)ethyldimethylsiloxy]pentacyclo[9.5.1.1 (3,9).1(5,15).1(7,13)]octasiloxane; 1,3,5,7,9,11,13,15-octavinylpentacyclo[9.5.1.1(3,9).1(5,15).1(7,13)]octasiloxane; 1,3,5,7,9,11,13,15-octa[vinyldimethylsiloxy]pentacyclo[9.5.1.1(3,9).1(5,15).1(7,13)]octasiloxane; 1,3,5,7,9,11,13,15-octakis(dimethylsilyloxy)pentacyclo[9.5.1.1(3,9).1(5,15).1(7,13)]octasiloxane; 1,3,5,7,9,11,13,15-octahydropentacyclo[9.5.1.1(3,9).1(5,15).1(7,13)] octasiloxane; 1-(3-mercapto)propyl-3,5,7,9,11,13,15-isobutylpentacyclo[9.5.1.1(3,9).1(5,15).1(7,13)] octasiloxane; 1-(3-mercapto)propyl-3,5,7,9,11,13,15-isooctylpentacyclo[9.5.1.1(3,9).1(5,15).1(7,13)] octasiloxane; and the like.

Exemplary silsesquioxanes having an open cage structure include 1,3,5,7,9,11,14-heptacyclohexyltricyclo[7.3.3.1(5,11)]heptasiloxane-endo-3,7,14-triol; 1,3,5,7,9,11,14-heptacyclopentyltricyclo[7.3.3.1 (5,11)]heptasiloxane-endo-3,7,14-triol; 1,3,5,7,9,11-octaisobutyltetracyclo[7.3.3.1(5,11)] octasiloxane-endo-3,7-diol; 1,3,5,7,9,11,14-heptaethyltricyclo[7.3.3.1(5,11)]heptasiloxane-endo-3,7,14-triol; 1,3,5,7,9,11,14-heptaisobutyltricyclo[7.3.3.1(5,11)]heptasiloxane-endo-3,7,14-triol; 1,3,5,7,9,11,14-heptaisooctyltricyclo[7.3.3.1(5,10]heptasiloxane-endo-3,7,14-triol; 1,3,5,7,9,11,14-heptaphenyltricyclo[7.3.3.1(5,11)]heptasiloxane-endo-3,7,14-triol; tricyclo[7.3.3.3(3,7)] octasiloxane-5,11,14,17-tetraol-1,3,5,7,9,11,14,17-octaphenyl; 9-{dimethyl[2-(5-norbornen-2-yl)ethyl]silyloxy}-1,3,5,7,9,11,14-heptaisobutyltricyclo[7.3.3.1 5,11]heptasiloxane-1,5-diol; endo-3,7,14-tris{dimethyl[2-(5-norbornen-2-yl)ethyl]silyloxy}-1,3,5,7,9,11,14-heptaisobutyltricyclo[7.3.3.1(5,11)]heptasiloxane; [[dimethyl(trifluoromethyl)ethyl]silyloxy] heptacyclopentyltricycloheptasiloxanediol; 1,3,5,7,9,11,14-heptacyclohexyltricyclo[7.3.3.1(5,11)]heptasiloxane-3,7,14-triol; 1,3,5,7,9,11,14-heptaisobutyltricyclo[7.3.3.1(5,11)] heptasiloxane-endo-3,7,14-triol; 1,3,5,7,9,11-octacyclopentyltetracyclo[7.3.3.1(5,11)]octasiloxane-endo-3,7-diol; 1,3,5,7,9,11,14-hepta-isooctyltricyclo[7.3.3.1(5,11)]heptasiloxane-endo-3,7,14-triol; endo-3,7,14-trifluoro-1,3,5,7,9,11,14-heptacyclopentyltricyclo[7.3.3.1(5,11)] heptasiloxane; endo-3,7,14-tris{dimethyl[2-(5-norbornen-2-yl)ethyl]silyloxy}-1,3,5,7,9,11,14-heptacyclopentyltricyclo[7.3.3.1(5,11)]heptasiloxane; tris((dimethyl (trifluoromethyl)ethyl)silyloxy)heptacyclopentyltricyclo-heptasiloxane; 3,7,14-tris{[3-(epoxypropoxy)propyl]dimethylsilyloxy}-1,3,5,7,9,11,14-heptacyclopentyltricyclo[7.3.3.1(5,11)]heptasiloxane, and the like.

A combination of the silsesquioxanes with an open cage structure or closed cage structure can be used as the silsesquioxane in conjunction with a combination of any of the other silicate nanoparticles.

In an embodiment, the silicate nanoparticle is a silicate mineral such as cyclosilicate, inosilicate, nesosilicate, phyllosilicate, sorosilicate, tectosilicate, or a combination thereof.

Cyclosilicates are silicates with tetrahedrons that can link to form rings of three $(Si_3O_9)^{-6}$, four $(Si_4O_{12})^{-8}$, six $(Si_6O_{18})^{-12}$ or nine $(Si_9O_{27})^{-18}$ units. Exemplary cyclosilicates include benitoite, axinite, beryl, cordierite, tourmaline, papagoite, eudialyte, milarite, and the like.

The inosilicate can have a crystalline structure in the form of a chain such as pyroxenes and pyroxenoids (with a crystalline structure of single chains $(SiO_3)^{-2}$) or amphiboles (with a crystalline structure of double chains $(Si_4O_{11})^{-6}$). Non-limiting examples of pyroxenes and pyroxenoids include diopside, spodumene, wollastonite, enstatite, hypersthene, hedenbergite, augite, pectolite, diallage, fassaite, spodumene, jeffersonite, aegirine, omphafacite, hiddenite, and the like. Non-limiting examples of amphiboles are calcium amphiboles such as tremolite, actinote, and hornblende; iron-magnesium amphiboles such as grunerite and cummingtonite; and sodium amphiboles such as glaucophane, arfvedsonite and riebeckite; and the like.

Non-limiting examples of nesosilicates are alite, almandine, andalousite, andalusite, andradite, belite, chloritoid, chondrodite, clinohumite, datolite, dumortierite, fayalite, forsterite, grossular, humite, hydrogrossular, kyanite, norbergite, olivine, phenakite, pyrope, sillimanite, spessartine, staurolite, thaumasite, thorite, titanite, topaz, uvarovite, zircon, and the like.

The phyllosilicate can be a clay, mica, serpentine, chlorite, or a combination thereof. Exemplary phyllosicates include antigorite, biotite, chlorite, chrysotile, glauconite, halloysite, illite, kaolinite, lepidolite, lizardite, margarite, montmorillonite, muscovite, palygorskite, phlogopite, pyrophyllite, talc, vermiculite, and the like.

The sorosilicate can be allanite, clinozoisite, dollaseite, epidote, hemimorphite, ilvaite, lawsonite, prehnite, tanzanite, vesuvianite, zoisite, and the like.

The tectosilicate can be, for example, albite, alkali-feldspars, analcime, andesine, anorthite, anorthoclase, bytownite, cancrinite, celsiane, chabazite, coesite, cristobalite, feldspar, feldspathoid, hauyne, heulandite, labradorite, lazurite, leucite, marialite, meionite, microcline, mordenite, natrolite, nepheline, nosean, oligoclase, orthoclase, petalite, plagioclase, quartz, sanidine, scapolite, scolecite, silica, sodalite, stilbite, tridymite, zeolite, and the like.

Exemplary zeolites include naturally occurring zeolites such as amicite, analcime, barrerite, bellbergite, bikitaite, boggsite, brewsterite, chabazite, clinoptilolite, cowlesite, dachiardite, edingtonite, epistilbite, erionite, faujasite, ferrierite, garronite, gismondine, gmelinite, gobbinsite, gonnardite, goosecreekite, harmotome, herschelite, heulandite, laumontite, levyne, maricopaite, mazzite, merlinoite, mesolite, montesommaite, mordenite, natrolite, offretite, paranatrolitem, paulingite, pentasil, perlialite, phillipsite, pollucite, scolecite, sodium dachiardite, stellerite, stilbite, tetranatrolite, thomsonite, tschernichite, wairakite, wellsite, willhendersonite, and yugawaralite. In some embodiments, the zeolite is analcime, chabazite, clinoptilolite, heulandite, natrolite, phillipsite, stilbite, or a combination thereof. A synthetic zeolite also can be used as the tectosilicate of the silicate nanoparticle. The synthetic zeolites can be selected from Zeolite A, Zeolite B, Zeolite F, Zeolite H, Zeolite L, Zeolite T, Zeolite W, Zeolite X, Zeolite Y, Zeolite Omega, Zeolite ZSM-5, Zeolite ZSM-4, Zeolite P, Zeolite N, Zeolite D, Zeolite O, Zeolite S, and Zeolite Z.

In an embodiment, the silicate nanoparticle can include other elements or components in addition to silicon and oxygen. The silicate nanoparticle can include an oxide, for example, silicon dioxide ($SiO_2$), aluminum oxide ($Al_2O_3$), barium oxide (BaO), bismuth trioxide ($Bi_2O_3$), boron oxide ($B_2O_3$), calcium oxide (CaO), cesium oxide (CsO), lead oxide (PbO), strontium oxide (SrO), rare earth oxides (e.g., lanthanum oxide ($La_2O_3$), neodymium oxide ($Nd_2O_3$), samarium oxide ($Sm_2O_3$), cerium oxide ($CeO_2$)), and the like. An exemplary silicate nanoparticle containing $SiO_2$ includes quartz, cristobalite, tridymite, and the like. The other elements can be, for example, aluminum, antimony, arsenic, barium, beryllium, boron, calcium, cerium, cesium, chromium, cobalt, copper, gallium, gold, iron, lanthanum, lead, lithium, magnesium, manganese, molybdenum, neodymium, nickel, niobium, palladium, phosphorus, platinum, potassium, praseodymium, silver, sodium, tantalum, thorium, titanium, vanadium, zinc, zirconium, and the like. The other elements can occur in the silicate nanoparticle in the form of oxides, carbonates, nitrates, phosphates, sulfates, or halides. Furthermore, the other element can be a dopant in the silicate nanoparticle.

It is contemplated that the silicate nanoparticle is functionalized with the aromatic compound or a chemical group from the aromatic compound. Functionalization of the silicate nanoparticle to form the functionalized silicate nanoparticle can be achieved by a cation exchange reaction, substitution, condensation, aryl (or heteroaryl) alkoxysilane chemistry, and the like. Without wishing to be bound by the theory, the silicate nanoparticle can have a group such as a hydroxy group on its surface that interacts with and can react with the aromatic compound or chemical group thereof.

As noted above, the aromatic compound includes a chemical group that has a first portion and a second portion, which includes an aromatic moiety. The first portion is directly bonded to the silicate nanoparticle in the functionalized silicate nanoparticle. In terms of formulas (1), (2), and (3), the second portion includes the aromatic moiety Ar. Also, the first portion can include the A group (e.g., nitrogen or phosphorous), Si, oxygen (—O—), or linker group L in formulas (1), (2), and (3).

In an embodiment, the aromatic compound is a compound of formula (2) in which the central silicon atom is bonded to the silicate nanoparticle. In an embodiment, the aromatic compound of formula (1) is bonded to the silicate nanoparticle via directly bonding the A group to the silicate nanoparticle.

In another embodiment, the chemical group is derived from an aromatic compound of formula (1), (2), or (3). In a specific embodiment, the chemical group is derived from an aryl quaternary ammonium salt, aryl quaternary phosphonium salt, aryl alkoxy silane, aryl halide, heteroaryl quaternary ammonium salt, heteroaryl quaternary phosphonium salt, heteroaryl alkoxy silane, or heteroaryl halide. Here, the chemical group can be derived from the aromatic compound (e.g., by hydrolysis, photolytic cleavage, thermal decomposition, elimination, substitution, etc.) to produce the chemical group including the aromatic moiety Ar with or without the linker group L, such that the chemical group is bonded to the silicate nanoparticle. In formula (1), the bond between the A group and linker group, aromatic moiety Ar, or R group is broken. In formula (2), the bond between the Si atom and oxygen atom (—O—), linker group L, aromatic moiety Ar, or R group is broken. In formula (3), the bond between the halogen X and linker group or aromatic moiety Ar is broken. Thus, in an embodiment, the aromatic moiety Ar is directly bonded to the silicate nanoparticle. Alternatively, the linker group L can remain attached to the aromatic moiety Ar such that the linker group L is directly bonded to the silicate nanoparticle with the aromatic moiety Ar indirectly bonded to the silicate nanoparticle via the linker group L. In an embodiment, the R group is directly bonded to the silicate nanoparticle. Consequently, it is contemplated that the linker group L can be disposed between the silicate nanoparticle and the second portion of the chemical group in the functionalized silicate nanoparticle. Thus, the functionalized silicate nanoparticle can be a reaction product of the silicate nanoparticle with the aromatic compound, chemical group derived from the aromatic compound, or a combination thereof.

In an embodiment, the functionalized silicate nanoparticle can be prepared by contacting the silicate nanoparticle with the aromatic compound or chemical group thereof under conditions effective to functionalize the silicate nanoparticle. The chemical group can be prepared by subjecting the aromatic compound to conditions effective to break bonds within the aromatic compound with a product fragment being the chemical group comprising the first and second portions herein. Conditions include those of temperature, pressure, catalysis (e.g., acid catalysis, metal catalysis, support (e.g., zeolite) promotion, and the like), and the like. After contact of the silicate nanoparticle with the aromatic compound or chemical group, the aromatic compound or chemical group is bonded to the silicate nanoparticle to form the functionalized silicate nanoparticle.

In a particular embodiment, an aryl alkoxy silane (e.g., trimethyl(2-phenylethoxy)silane contacts a silicate nanoparticle clay (e.g., montmorillonite), and the silicon of the trimethyl(2-phenylethoxy)silane bonds to the montmorillonite to form a functionalized silicate nanoparticle, having a phenyl ring extending from the surface of the montmorillonite to form a phenyl terminated functionalization. In another embodiment, the trimethyl(2-phenylethoxy)silane is subjected to a lysis condition to produce an aromatic moiety of a (2-phenylethyl)oxidanyl radical, which subsequently bonds to the montmorillonite to form the functionalized silicate nanoparticle, having a phenyl ring extending from the surface of the montmorillonite to form a phenyl terminated functionalization. Here, the linker group is —CH2O—, which is directly bonded to the silicate nanoparticle via oxygen (O) and directly bonded to the phenyl ring by the methylene (—CH$_2$—).

In another embodiment, a heteroaryl quaternary ammonium salt (e.g., N,N-dimethyl-N-(pyridine-3-ylmethyl)ethanaminium chloride (DMPME)) contacts a silicate nanoparticle silsesquioxane (e.g., 1-allyl-3,5,7,9,11,13,15-heptacyclopentylpentacyclo[9.5.1.1(3,9).1(5,15).1(7,13)] octasiloxane). The resulting functionalized silicate nanoparticle includes the silsesquioxane directly bonded to the amino nitrogen of the DMPME with the pyridinyl ring extending (via the methylene amino (—CH$_2$N—) linker group) from the surface of the DMPME to form a pyridinyl terminated functionalization.

The composition is effective to remove an asphaltene particle from a substrate such as a metal, composite, sand, rock, mineral, glass, formation, downhole element, or a combination thereof. Without wishing to be bound by theory, it is believed that the functionalized silicate nanoparticle is an amphiphile (i.e., having hydrophilic and lipophilic portions) and interacts with both the substrate and the asphaltene particle. It is contemplated that, within the functionalized silicate nanoparticle, the silicate nanoparticle is hydrophilic with a greater affinity for the substrate than the asphaltene particle, and the aromatic functionalization (either aryl or heteroaryl terminated functionalization) is lipophilic with a greater affinity for the asphaltene particle than the substrate. Moreover, the asphaltene particle has a greater affinity for the aromatic functionalization of the functionalized silicate nanoparticle than the silicate nanoparticle portion of the functionalized silicate nanoparticle or the substrate.

In an embodiment, in addition to the functionalized silicate nanoparticle, the composition also includes a fluid. The fluid can be present in an amount to increase a separation and aid removal of the asphaltene particle from the substrate. That is, while the functionalized silicate nanoparticle separates or removes the asphaltene particle from the substrate, the fluid can sweep the removed asphaltene particle (which has been desorbed from the substrate) away from a location proximate to the substrate. In an embodiment, the fluid can also aid in separating the asphaltene particle from the substrate. In an embodiment, the asphaltene particle has a greater affinity for the fluid than the substrate or the silicate nanoparticle portion of the functionalized silicate nanoparticle.

Exemplary fluids include water (liquid or steam), oil, carbon dioxide, C1-C6 alkane (e.g., gaseous or liquefied at a temperature or pressure of the surrounding environment of the composition), tetrahydrofuran, 1,4-dioxane; diglyme, triglyme, acetonitrile, propionitrile, benzonitrile, N,N-dimethylformamide, N,N-dimethylacetamide, dimethylsulfoxide, nitrobenzene, sulfolane, acetone, butanone, cyclohexanone, diethyl ketone, methyl isobutyl ketone, 2-pentanone, 2-hexanone, 2-heptanone, 3-heptanone, 4-heptanone, 3-pentanone, brine, completion fluid, acid, base, gas, polar solvent, nonpolar solvent, or a combination thereof. Additional exemplary fluids also include those typically encountered downhole, such as hydrocarbons, solvents, or an aqueous environment that includes formation water, seawater, salt (i.e., brine, including formates and inorganic salts, e.g., NaCl, KCl, $CaCl_2$, $MgCl_2$, $CaBr_2$, $ZnBr_2$, NaBr, and the like), completion brine, stimulation treatment fluid, remedial cleanup treatment fluid, acidic or corrosive agent such as hydrogen sulfide, hydrochloric acid, or other such corrosive agents, or a combination thereof. Solvents include an inorganic solvent, organic solvent, or a combination thereof. Exemplary solvents include water, alcohols (e.g., methanol, ethanol, and the like), polyhydric alcohols (e.g., diethylene glycol, dipropylene glycol, 1,2-propanediol, 1,4-butanediol, 1,3-butanediol, glycerol, 1,5-pentanediol, 2-ethyl-1-hexanol, and the like), ketones (e.g., acetophenone, methyl-2-hexanone, and the like), ethers (e.g., ethylene glycol monobutyl ether, triethylene glycol monomethyl ether, and the like), carboxylic acid esters (e.g., [2,2-butoxy(ethoxy)]ethyl acetate and the like), esters of carbonic acid (e.g., propylene carbonate and the like), inorganic acids (e.g., hydrofluoric acid, hydrochloric acid, phosphoric acid, sulfuric acid, nitric acid, and the like), organic acids (e.g., those having an C1-C10 alkyl chain, which is a straight or branched chain and can be substituted), or a combination thereof.

The brine can be, for example, seawater, produced water, completion brine, or a combination thereof. The properties of the brine can depend on the identity and components of the brine. Seawater, as an example, contains numerous constituents such as sulfate, bromine, and trace metals, beyond typical halide-containing salts. On the other hand, produced water can be water extracted from a production reservoir (e.g., hydrocarbon reservoir), produced from the ground. Produced water is also referred to as reservoir brine and often contains many components such as barium, strontium, and heavy metals. In addition to the naturally occurring brines (seawater and produced water), completion brine can be synthesized from fresh water by addition of various salts such as NaCl, $CaCl_2$, or KCl to increase the density of the brine, such as 10.6 pounds per gallon of $CaCl_2$ brine. Completion brines typically provide a hydrostatic pressure optimized to counter the reservoir pressures downhole. The above brines can be modified to include an additional salt. In an embodiment, the additional salt included in the brine is NaCl, KCl, NaBr, $MgCl_2$, $CaCl_2$, $CaBr_2$, $ZnBr_2$, $NH_4Cl$, sodium formate, cesium formate, and the like. The salt can be present in the brine in an amount from about 0.5 wt. % to about 50 wt. %, specifically about 1 wt. % to about 40 wt. %, and more specifically about 1 wt. % to about 25 wt. %, based on the weight of the composition The density, polarity, hydrophilicity, lipophilicity, and the like of the fluid can be achieved by selection of the foregoing fluids. The selection of the fluid can depend on, for example, a desired density for the composition. In an embodiment, fluid is present in the composition in an amount from about 1 weight percent (wt. %) to about 99 wt. %, specifically about 10 wt. % to about 90 wt. %, and more specifically about 20 wt. % to about 80 wt. %, based on the weight of the composition.

The composition can be prepared by combining the fluid with the functionalized silicate nanoparticle. In an embodiment, the fluid is combined with the aromatic compound and silicate nanoparticle with subsequent formation of the functionalized silicate nanoparticle. According to an embodiment, the functionalized silicate nanoparticle can contact an asphaltene particle prior to addition of the fluid. In an embodiment, the silicate nanoparticle is contacted with the chemical group (which includes the aromatic moiety) derived from the aromatic compound, such as by breaking a bond between the chemical group and the rest of the aromatic compound. Consequently, it will be appreciated that the functionalized silicate nanoparticle is a reaction product of the silicate nanoparticle and the aromatic compound or chemical group thereof.

In an embodiment, a method for making the functionalized silicate nanoparticle includes contacting the silicate nanoparticle with a chemical group to form the functionalized silicate nanoparticle. The chemical group includes a first portion and a second portion comprising an aromatic moiety. In forming the functionalized silicate nanoparticle, the first portion is directly bonded to the silicate nanoparticle in the functionalized silicate nanoparticle. The aryl moiety extends from the surface of the functionalized silicate nanoparticle by the first portion.

The functionalized silicate nanoparticle herein has many uses and beneficial properties. In an embodiment, the functionalized silicate nanoparticle is effective to remove an asphaltene particle or other aromatic species from a substrate comprising a metal, composite, sand, rock, mineral, glass, formation, downhole element, or a combination thereof.

According to an embodiment, an asphaltene particle, which is disposed on a substrate, can be removed from the substrate by contacting the asphaltene particle with the functionalized silicate nanoparticle. The functionalized silicate nanoparticle can be interposed between the asphaltene particle and the substrate. The asphaltene particle can be separated from the substrate with the functionalized silicate nanoparticle and removed from the substrate.

In an embodiment, the asphaltene particle can be exfoliated using the functionalized silicate nanoparticle. Without wishing to be bound by theory, it is believed the aromatic moiety of the functionalized silicate nanoparticle can intercalate in a gallery of the asphaltene particle. The functionalized silicate nanoparticle can be heated to a temperature effective to exfoliate the functionalized silicate nanoparticle, asphaltene particle, or a combination thereof. According to an embodiment, the functionalized silicate nanoparticle expands upon heating. As a result of the expansion, a distance increases between neighboring aromatic moieties that are tethered to the functionalized silicate nanoparticle. The asphaltene particles expand and exfoliate in response to the increased distance between the neighboring aromatic moieties of the functionalized silicate nanoparticle that are intercalated in the gallery of asphaltene molecules of the asphaltene particle. Exfoliation of the asphaltene particle can occur for asphaltene particles attached to the substrate or for those asphaltene particles that are not attached to a substrate.

The removal of the asphaltene particle from the substrate can also include contacting the asphaltene particle with a fluid. Here, contact of the fluid can increase a distance of separation between the asphaltene particle and the substrate before or after separating the asphaltene particle from the substrate.

Beneficially, the methods herein, e.g., contacting the silicate nanoparticle with the chemical group to form the functionalized silicate nanoparticle, can be performed in-situ in an environment such as a pipeline, downhole, formation, tubular, frac feature (e.g., a vein or pore), production zone, reservoir, refinery, transport tube, production tube, or a combination thereof. Moreover, the asphaltene particle or exfoliated asphaltene can be removed from the environment after separating the asphaltene particle from the substrate.

Furthermore, it has been found that perturbing the internal structure of asphaltene particles, for example, in a micelle or other aggregate, can lead to increased quality of oil containing asphaltenes. Additionally, degradation of asphaltene aggregates herein enhances production of petroleum fluid in a downhole, subsurface, or ground environment. Furthermore, removal of asphaltene from pores of a rock formation, within a reservoir, or from a sidewall of a tubular, production tubing, borehole, or transportation tube can improve the permeability of such structures, leading to increased quality of oil as well as increased or prolonged lifetime for oil production.

In an embodiment, a method for decomposing an asphaltene particle includes contacting the asphaltene particle with the functionalized silicate nanoparticle and causing the intercalating agent to increase a distance between asphaltene molecules in the asphaltene particle to decompose the asphaltene particle. As above, the aromatic moiety of the functionalized silicate nanoparticle can be disposed in the gallery between adjacent asphaltene molecules or disposed at the periphery of an asphaltene molecule such as proximate to an edge of an aromatic plane or terminal chain attached to an aromatic portion of an asphaltene molecule in the asphaltene particle. During the exfoliation of the asphaltene particle, the functionalized silicate nanoparticle portion in the gallery forces the adjacent asphaltene molecules away from one another, thereby separating the asphaltene molecules. In this manner, an asphaltene molecule can be exfoliated from the asphaltene particle.

As used herein, "decomposition" refers to an increased separation distance between asphaltene molecules in an asphaltene particle, expansion of the volume of the asphaltene particle, complete removal of an asphaltene molecule from an asphaltene particle, or a change in the electronic structure or bonding in an asphaltene molecule in an asphaltene particle. Thus, decomposition includes, for example, deagglomeration, exfoliation, disaggregation, and the like. An example of a change in the electronic structure or bonding in an asphaltene molecule in an asphaltene particle includes converting a bond (e.g., converting a π bond to θ bond or vice versa), breaking a bond, or forming a bond.

Thus, according to an embodiment, the method includes exfoliating an asphaltene particle. In an embodiment, exfoliating includes removing an asphaltene molecule from the asphaltene particle. Exfoliation of an asphaltene particle, in an embodiment, decreases the number of asphaltene molecules in the asphaltene particle. It will be appreciated that exfoliation of asphaltene particles can provide exfoliated asphaltene as a single asphaltene molecule or as a micelle or layered particle containing fewer asphaltene molecules than the non-exfoliated asphaltene particle.

In a further embodiment, the method includes increasing the temperature of the functionalized silicate nanoparticle, asphaltene particle, or substrate. Increasing the temperature includes techniques that can elevate the temperature to about 60° C. to about 1200° C., specifically about 100° C. to about 1000° C., and more specifically about 100° C. to about 800° C. Such techniques involve, for example, in-situ combustion, steam introduction, heated fluid injection, or a combination comprising at least one of the foregoing. In an embodiment, a downhole environment is heated by introducing steam in an injection well with the steam propagating through the formation and heating the functionalized silicate nanoparticle, asphaltene particle, or substrate. It is contemplated that increasing the temperature can cause reaction, including decomposition of the functionalized silicate nanoparticle, substrate, or asphaltene particle. In addition, the asphaltene particles can be heated to expand, decreasing the mutual attraction among asphaltene molecules therein. Depending on the amount of expansion of the asphaltene particle, asphaltene molecules can exfoliate from the asphaltene particles. In one embodiment, the heating of a functionalized silicate nanoparticle associated with the asphaltene particle can lead to exfoliation of an asphaltene molecule therefrom.

Heated fluid injection can include heating a fluid (e.g., a solvent) and subsequently disposing the heated fluid downhole to increase the temperature of the asphaltene particles. In a non-limiting embodiment, in-situ combustion increases the temperature of the functionalized silicate nanoparticle by injecting a gas containing oxygen, for example air, downhole and igniting oil in the reservoir. The combustion releases heat, which can be absorbed by the functionalized silicate nanoparticle or asphaltene particle, in order to exfoliate an asphaltene molecule from the asphaltene particle.

In certain embodiments, the method further includes applying sonic frequencies to the intercalating agent. The sonic frequencies can be from about 400 hertz (Hz) to about 400 megahertz (MHz), specifically about 800 Hz to about 350 MHz, and more specifically about 1 kilohertz (kHz) to about 300 MHz. A transducer placed near the asphaltene particle can produce the sonic frequency, which can destructively interact with the asphaltene particle or functionalized silicate nanoparticle. Sonic frequencies may induce chemical reactions or expansion of the functionalized silicate nanoparticle and disrupt interparticle bonding in the asphaltene particle, leading to exfoliation of an asphaltene molecule. The sonic frequencies can detach neighboring polyaromatic planes of adjacent asphaltene molecules. Without wishing to be bound by any particular theory, such deterioration of the asphaltene particle may be induced by short-lived, localized disturbances (e.g., a hot spot) produced by the implosion of bubbles in the course of acoustic cavitation.

In some embodiments, the functionalized silicate nanoparticle is dispersed in a fluid. Such dispersion can occur before or after contacting the asphaltene particle with the functionalized silicate nanoparticle. The fluid can be an organic solvent, inorganic solvent, or a combination comprising at least one of the foregoing. Exemplary fluids are those above and can include $CH_3NO_2$, $CH_2Cl_2$, $CHCl_3$, $CCl_4$, $C_2H_4Cl_2$, $H_2O$, $SOCl_2$, $SO_2Cl_2$, $S_3N_3Cl_3$, benzene, toluene, o-xylene, dimethyl sulfoxide, furan, tetrahydrofuran, o-dioxane, m-dioxane, p-dioxane, dimethoxyethane, n-methyl-pyrrolidone, n,n-dimethylacetamide, γ-butyrolactone, 1,3-dimethyl-2-imidazolidinone, benzyl benzoate, hexafluorobenzene, octafluorotoluene, pentafluorobenzonitrile, pentafluoropyridine, pyridine, dimethylformamide, hexamethylphosphoramide, nitromethane, benzonitrile, or the like. In an embodiment, the fluid can react with the functionalized silicate nanoparticle to produce product compounds that decompose the asphaltene particle.

In another embodiment, after contact with the functionalized silicate nanoparticle, the asphaltene particle can be heated. The heat is absorbed by the asphaltene molecule, causing high amplitude vibrational motion of the non-polar groups, e.g., hydrocarbon tails that terminate an asphaltene molecule. In this manner, exfoliation of asphaltene molecules can occur by vibrationally-mediated dissociation or further increased spacing among the asphaltene molecules in the asphaltene particle. Additionally, the heated asphaltene particles can be more miscible with the fluid. Here, the fluid can be as before and can include, for example, an alkane, aromatic solvent, carbon dioxide, carbon disulfide, resin, oil, or a combination thereof. Particular fluids include, 2,2-dimethylpropane, butane, 2,2-dimethylbutane, pentane, hexane, heptane, octane, nonane, decane, unedecane, cyclopentane, cyclohexane, benzene, toluene, o-xylene, dimethyl sulfoxide, furan, tetrahydrofuran, o-dioxane, m-dioxane, p-dioxane, dimethoxyethane, n-methyl-pyrrolidone, n,n-dimethylacetamide, γ-butyrolactone, 1,3-dimethyl-2-imidazolidinone, benzyl benzoate, hexafluorobenzene, octafluorotoluene, pentafluorobenzonitrile, pentafluoropyridine, pyridine, dimethylformamide, hexamethylphosphoramide, nitromethane, benzonitrile, and the like.

In another embodiment, a fluid or surfactant can contact the exfoliated asphaltene particle and allow dispersion of the asphaltene particle, for example, in an oil. Exemplary fluids include solvent such as a polar solvent, aromatic solvent, or a combination comprising at least one of the foregoing. The polar solvent can be an alcohol (e.g., ethanol, propanol, glycol, and the like), amine (e.g., methylamine, diethyl amine, tributyl amine, and the like), amide (e.g., dimethylformamide), ether (e.g., diethyl ether, polyether, tetrahydrofuran, and the like), ester (e.g., ethyl acetate, methyl butyrate, and the like), ketone (e.g., acetone), acetonitrile, dimethylsulfoxide, propylene carbonate, and the like. The aromatic solvent can be, for example, benzene, toluene, xylene, pyridine, hexafluorobenzene, octafluorotoluene, pentafluoropyridine, and the like.

The methods and materials herein can be used to enhance oil recovery in a reservoir, borehole, downhole, production zone, formation, or a combination thereof. Additionally, the methods and materials can be used to increase flow velocity of oil in a processing facility, refinery, pre-refinery facility, tubular, reactor, or a combination thereof. Removal of the asphaltene molecules from the substrate by the functionalized silicate nanoparticle herein can be used to extract asphaltene deposits that constrict flow in, for example, a tubular, and can restore flow in a plugged reservoir. Additionally, exfoliation of asphaltenes can increase permeability in porous media (e.g., a sand screen that can be deformable such as a polymeric open-cell foam) and flow channels (e.g., a crack in a formation filled with proppant such as obtained in a fracking process). As a result of exfoliation to decrease the number of asphaltene molecules in an asphaltene particle, oil viscosity also decreases. Lowering the viscosity of the oil improves production efficiency. Additionally, the detrimental effects of asphaltene can be diminished or eliminated, including alleviation of flocculates of asphaltenes that can plug a reservoir or production tubing, restrict flow in a transport line, stabilize water-in-oil emulsions, foul a production facility, alter wettability of porous rock in the reservoir, or poison a refinery catalyst.

Thus, in an embodiment, a method for producing decomposed asphaltene includes disposing a functionalized silicate nanoparticle in an oil environment and contacting an asphaltene particle in the oil environment with the functionalized silicate nanoparticle. The embodiment also includes decomposing the asphaltene particle to produce decomposed asphaltene. In a certain embodiment, the method also includes breaking a water-in-oil emulsion in response to decomposing the asphaltene particle. Here the oil-in-water emulsion can be a Pickering emulsion that is stabilized by asphaltene particles at the water-oil interface. Upon decomposing the asphaltene particles, the emulsion is destabilized and thus broken.

In addition, water can be introduced by methods such as hot water injection, steam stimulation, or a combination comprising at least one of the foregoing. It is believed that, in this way, the asphaltene particles decompose as exfoliation of asphaltene molecules in the asphaltene particles occurs. As a result, the viscosity of oil in the oil environment is reduced. Moreover, increasing the mobility of the asphaltene particles by removing them from the substrate is advantageous as noted above. Therefore, the method can be used to enhance oil recovery. In a further embodiment, the method includes increasing a permeability of a reservoir of the oil environment. According to another embodiment, the method further includes producing the oil including the decomposed or removed asphaltene from the oil environment, wherein decomposing the asphaltene particle occurs prior to producing the oil. Alternatively or in addition, decomposing the asphaltene particle can occur subsequent to producing the oil.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A process for removing an asphaltene particle from a substrate, the process comprising:
   contacting a silicate nanoparticle with a chemical group to form a functionalized silicate nanoparticle, the chemical group comprising:
   a first portion; and
   a second portion comprising an aromatic moiety, the first portion being directly bonded to the silicate nanoparticle in the functionalized silicate nanoparticle;
   contacting the asphaltene particle with the functionalized silicate nanoparticle, the asphaltene particle being disposed on the substrate;
   interposing the functionalized silicate nanoparticle between the asphaltene particle and the substrate; and
   separating the asphaltene particle from the substrate with the functionalized silicate nanoparticle to remove the asphaltene particle from the substrate.

2. The process of claim 1, further comprising exfoliating the asphaltene particle with the functionalized silicate nanoparticle.

3. The process of claim 2, wherein exfoliating the asphaltene particle comprises intercalating the aromatic moiety of the functionalized silicate nanoparticle in a gallery of the asphaltene particle.

4. The process of claim 2, further comprising heating the functionalized silicate nanoparticle to a temperature effective to exfoliate the functionalized silicate nanoparticle, asphaltene particle, or a combination thereof.

5. The process of claim 1, further comprising contacting the asphaltene particle with a fluid to increase a distance of separation between the asphaltene particle and the substrate after separating the asphaltene particle from the substrate.

6. The process of claim 5, wherein the fluid comprises water, oil, carbon dioxide, a liquefied C1-C6 alkane, completion fluid, brine, acid base, or a combination thereof.

7. The process of claim 1, wherein contacting the silicate nanoparticle with the group is performed in-situ in an environment comprising, a pipeline, downhole, formation, tubular, frac feature, production zone, reservoir, or a combination thereof.

8. The process of claim 7, further comprising removing the asphaltene particle from the environment after separating the asphaltene particle from the substrate.

9. The process of claim 1, wherein the substrate comprises a metal, composite, sand, rock, mineral, glass, formation, downhole element, or a combination thereof.

10. The process of claim 1, wherein the silicate nanoparticle comprises a silsesquioxane, cyclosilicate, inosilicate, nesosilicate, phyllosilicate, sorosilicate, tectosilicate, or a combination thereof.

11. The process of claim 10, wherein the phyllosilicate comprises halloysite, kaolinite, illite, montmorillonite, vermiculite, talc, palygorskite, pyrophyllite, or a combination thereof.

12. The process of claim 10, wherein the silicate nanoparticle comprises a platelet, sphere, polyhedron, or a combination thereof.

13. The process of claim 1, wherein the aromatic moiety comprises anthracyl, azulenyl, benzocyclooctenyl, benzocycloheptenyl, biphenylyl, chrysenyl, fluorenyl, indanyl, indenyl, naphthyl, pentalenyl, phenalenyl, phenanthrenyl, phenanthryl, phenyl, pyrenyl, tetrahydronaphthyl, a heteroaryl group, a derivative thereof, or a combination thereof.

14. The process of claim 13, wherein the heteroaryl group comprises acridinyl, benzimidazolyl, benzofuranyl, benzofurazanyl, benzothiazolyl, benzothiophenyl, benzoxazolyl, carbazolyl. chromanyl, cinnolinyl, dibenzofuranyl, furazanyl, furopyridinyl, furyl, imidazolyl, indazolyl, indolinyl, indolizinyl, indolyl, isochromanyl, isoindolinyl, isoindolyl, isoquinolinyl, isothiazolyl, isoxazolyl, naphthyridinyl, oxadiazolyl, oxazolyl, perimidinyl, phenanthridinyl, phenanthrolinyl, phenazinyl, phenoxathiinyl, phenothiazinyl, phenoxazinyl, phthalazinyl, pteridinyl, purinyl, pyrazinyl, pyrazolyl, pyridazinyl, pyridinyl, pyrimidinyl, pyrrolyl, quinazolinyl, quinolinyl, quinoxalinyl, tetrazolyl, thiadiazolyl, thiazolyl, thienyl, triazinyl, triazolyl, a derivative thereof, or a combination thereof.

15. The process of claim 1, wherein the chemical group is derived from an aryl quaternary ammonium salt, aryl quaternary phosphonium salt, aryl alkoxy silane, aryl halide, heteroaryl quaternary ammonium salt, heteroaryl quaternary phosphonium salt, heteroaryl alkoxy silane, heteroaryl halide, or a combination thereof.

16. The process of claim 1, wherein the first portion of the chemical group comprises a bond, linker group, or a combination thereof.

17. The process of claim 16, wherein the linker group comprises a bond, C1 to C30 alkylene, C3 to C30 cycloalkenylene, C1 to C30 fluoroalkylene, C3 to C30 cycloalkylene, C3 to C30 heterocycloalkylene, C5 to C30 arylene, C6 to C40 aralkylene, C6 to C30 aryleneoxy, C2 to C30 heteroarylene, C6 to C40 heteroaralkylene, C2 to C30 alkenylene, C2 to C30 alkynylene, C1 to C30 amide, amine, C1 to C30 oxyalkylene, C1 to C30 oxyarylene, oxygen (O), sulfur (S), or a combination thereof, and the linker group is disposed between the silicate nanoparticle and the second portion of the chemical group in the functionalized silicate nanoparticle.

* * * * *